United States Patent [19]

Naito et al.

[11] Patent Number: 4,948,967
[45] Date of Patent: Aug. 14, 1990

[54] METHOD FOR DETECTING A POSITION RECEIVING A LIGHT BEAM

[75] Inventors: Masamitsu Naito, Tokyo; Michio Matsumoto, Ogawa, both of Japan

[73] Assignee: Taisei Corporation, Tokyo, Japan

[21] Appl. No.: 449,426

[22] Filed: Dec. 14, 1989

Related U.S. Application Data

[63] Continuation of Ser. No. 207,627, Jun. 16, 1988, abandoned.

[51] Int. Cl.$^5$ .............................................. H01J 40/14
[52] U.S. Cl. ............................... 250/227.28; 250/561
[58] Field of Search ............... 250/578, 227, 235, 561; 350/96.24

[56] References Cited

U.S. PATENT DOCUMENTS 4,074,142 2/1978 Jackson ............................... 250/578

Primary Examiner—Edward P. Westin
Attorney, Agent, or Firm—Cushman, Darby & Cushman

[57] ABSTRACT

Disclosed is a method for detecting a position receiving a light beam by using optical fibers. One-side end face of a plurality of optical fibers are arranged in a line or plane. Each optical fiber is branched by a light beam splitter having a plurality of output ports. The branched optical fibers are bundled into groups. Each group of the bundled optical fibers is connected to a light beam detecting sensor which consists of one light beam detecting member for detecting a position receiving a laser beam. Therefore, a large number of light beam sensors are not needed. As a result, the accompanying electronic circuits can be simplified, and high speed processing without any delay is also permitted.

1 Claim, 3 Drawing Sheets

METHOD FOR DETECTING A POSITION RECEIVING A LIGHT BEAM

This is a continuation of application No. 071,207,627, filed June 16, 1988, which was abandoned upon the filing hereof.

BACKGROUND OF THE INVENTION

1. Field of the Invention

The present invention relates to a method for detecting a position receiving a light beam, and more specifically to a method for detecting a spot of a position receiving a laser beam so as to measure various levels or heights and other distances.

2. Description of the Prior Art

A technique which takes advantage of the straight travelling nature of a light beam to make a precise measurement of lengths, distances, etc. is known.

For example, as shown in FIG. 6, a light beam receiving plate 12 is placed at a certain distance from a laser oscillator 11 to receive a laser beam 13 for the purpose of measuring a relative distance between the laser oscillator and the light beam receiving plate. A reference line is established so that a measurement can be made based on this reference line. Furthermore, as shown in FIG. 7, a laser beam is received by a light beam receiving plate 14 instead of the light beam receiving plate 12 to measure displacements of the position on X- and Y-axes, for example, for controlling the posture of an automatic excavator at the time of tunnel boring work.

Such a conventional light beam receiving plate is ordinarily provided with semiconductor diodes, i.e., light detecting elements called photodiodes, as sensors for converting the intensity of the received laser beam into electric signals.

FIG. 8 shows a light beam receiving plate, which is a so-called divided type, for example, to be used for making a one-dimensional measurement as in level measurement.

This divided type light beam receiving plate consists of five photodiodes arranged in a vertical row at intervals of the order of a millimeter. Each diode is provided thereon with a light beam receiving plate 12a, respectively. The light beam receiving plate 14, which is adapted to detect two-dimensional displacements, as shown in FIG. 7, is generally provided with light detecting elements arranged in the form of matrix with X- and Y-axes.

As stated above, a conventional light beam receiving plate requires, regardless of whether it is used for a one- or two-dimensional measurement, that an increased number of light detecting elements be used in measuring a larger span or displacement along the X- and Y-axes.

When an attempt is made to measure a position of a spot on a line ten meters long with an accuracy of 1 mm, it is necessary for 10,000 light detecting diodes to be incorporated into the plate.

This is also the case with two-dimensional measurements. As a replacement for the divided type light beam receiving plate there is also a non-divided type light beam receiving plate available, which detects the differences in electric resistance corresponding to the positions receiving a laser beam. This non-divided type has to be subjected to variations in the intensity of a laser beam due to the measuring circumstances and also in the luminosity of the spread light spot, which results in a troublesome calibration being required. Especially, the accompanying processing circuits become complicated, and, further, the analog processing circuits of the non-divided type do not allow high precision.

Still further, one light beam receiving plate of the non-divided type is as large as up to several centimeters. For a measurement of a long span, a large number of these non-divided type light beam receiving plates have to be combined, resulting in a high price of the plate.

In addition, for a two-dimensional measurement, there is a method wherein an image obtained by a charge coupled device (CCD), an image pick up tube, etc. is processed to detect a spot receiving a laser beam. An increase in the number of the picture elements for the purpose of increasing accuracy will also increase the processing time per picture element ranging from several tens of seconds to several minutes. Therefore, this method is unsatisfactory for high speed processing and is impractical.

In any event, as long as a conventional method is employed, any attempt to expand the scope of measurement, whether it is of one dimension or two dimensions, will increase the number of light detecting elements with the consequence that the light beam receiving plate becomes very expensive and that the processing circuits become complicated.

SUMMARY OF THE INVENTION

An object of this invention is to provide a method for detecting a light beam receiving spot to determine a position with respect to the bottommost portion of a light-beam receiving plane (hereinafter simply referred to as light beam receiving position), which eliminates the above described disadvantages and which covers a long and wide range of measurement and permits a detection of a spot receiving a laser beam with high accuracy and high speed even if the measured area is large.

As a means to attain the above object, the present invention provides a method wherein one-side end faces of a plurality of optical fibers are arranged in a form of a line or a plane to receive a light beam. Each of said optical fibers is connected to a light beam splitter which has a plurality of output ports. Optical fibers branched from said output ports of said light beam splitter are bundled into a plurality of groups. Each of said groups is connected to a photosensor by way of said optical fibers which consists of a light beam detecting element so that a laser beam transmitted from said line or plane can be detected.

The method for detecting a position receiving a light beam according to the present invention is constituted as stated above so that one-side end face of a plurality of optical fibers are arranged in a line or plane. Each optical fiber is branched by a light beam splitter having a plurality of output ports. The branched optical fibers are bundled into groups. Each group of the bundled optical fibers is connected to a light beam detecting member for detecting a position receiving a laser beam. Therefore, a large number of light beam sensors are not needed, unlike conventional methods.

As a result, the accompanying electronic circuits can be simplified, and high speed processing without any delay is possible.

DETAILED DESCRIPTION OF THE PREFERRED EMBODIMENT

The method according to the present invention will now be described in reference to the preferred embodiments.

Figure 1:
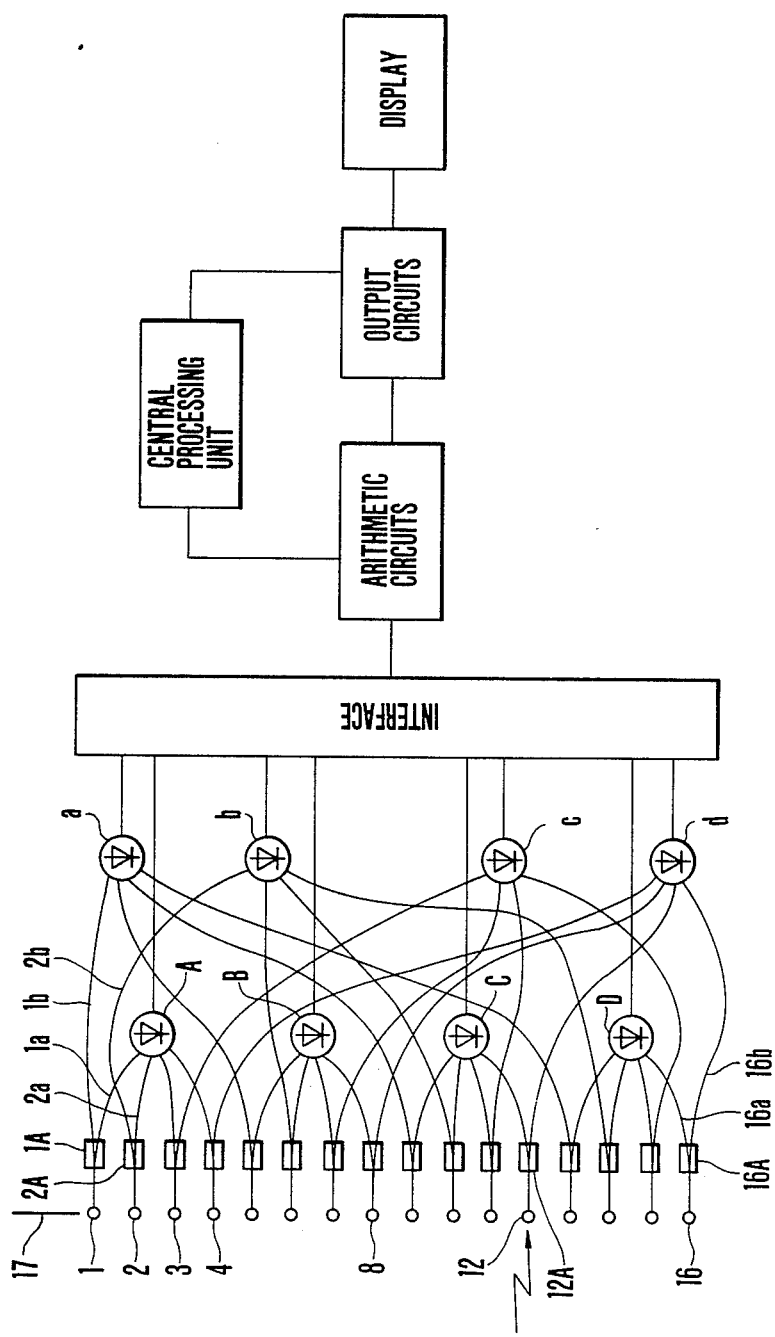
FIG. 1 is a structural view for explaining the principle, showing an embodiment wherein the method according to the present invention is applied to a light beam receiving plate for one-dimensional measurement.

FIG. 1 shows an embodiment of the light beam receiving plate for level measurement by way of a laser beam, that is, for one-dimensional measurement, wherein sixteen optical fibers have their one-side end faces arranged in a vertical row as a line.

The optical fibers 1, 2, 3, 4, . . . 16 arranged in the vertical row are each connected to beam splitters 1A, 2A, 3A, . . . 16A, respectively, which are each provided with output ports 1a, 1b, 2a, 2b, . . . 16a and 16b. Optical fibers extending from the output ports 1a, 2a, 3a, . . . 16a are bundled into a plurality of groups of four optical fibers which are each connected to one of photosensors A, B, C and D, respectively.

Optical fibers extending from the other output ports 1b, 2b, 3b, . . . 16b are also bundled into a plurality of groups of four optical fibers which are each connected to one of photosensors a, b, c and d, respectively, for the purpose of constituting a light beam receiving plate.

When the optical fibers are arranged so that their end faces are adapted to constitute a light beam receiving plate 17 in the form of a line, a laser beam received by the 12th optical fiber from above is detected by the photosensors C and d by way of the beam splitter 12A.

That is to say, optical fibers are connected to beam splitters each provided with two output ports. Further, optical extending from the output ports are bundled into a plurality of groups each constituted by four optical fibers. Each group is connected to corresponding photosensors A, B, C, D, a, b, c and d. Then, a laser beam received can be located by a total of eight photosensors.

Figure 2:
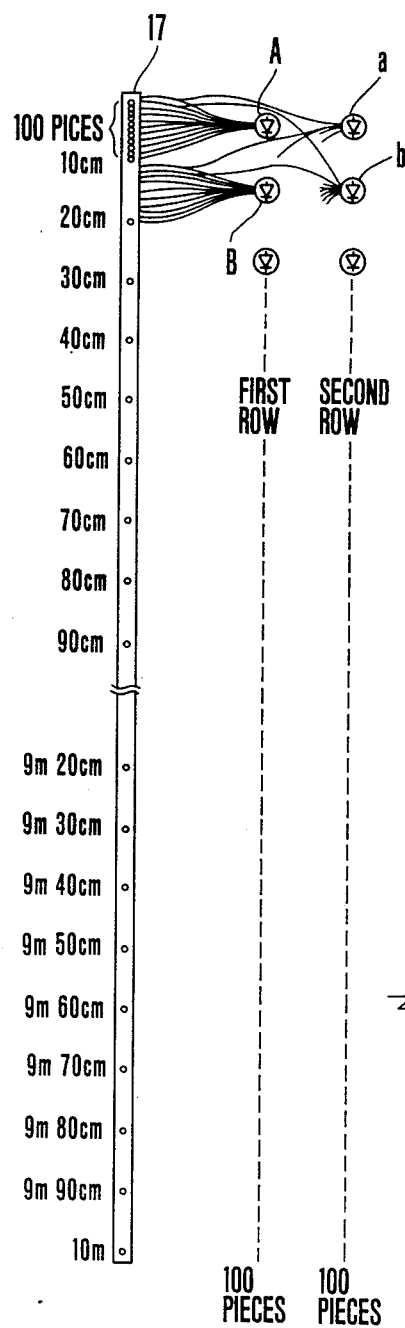
FIG. 2 is a structural view for explaining the principle, showing an embodiment wherein 10,000 optical fibers are arranged in a vertical row for one-dimensional measurement to detect a light beam receiving position.
Figure 3:
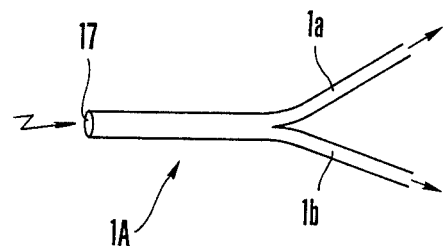
FIG. 3 is a schematic view showing the structure of a light beam splitter having two output ports.

Further, as shown in FIG. 2, ten thousand optical fibers are arranged in a vertical (or horizontal) direction in a rectilinear manner to form a light beam receiving plate for one-dimensional measurement, the plate having a light beam receiving plane aligned in a form of a line. Each optical fiber is connected, as shown in FIG. 3, to a beam splitter 1A which is each provided with two output ports 1a and 1b. Optical fibers extending from the output ports 1a are bundled into groups of one hundred optical fibers. Each group is connected to corresponding photosensors A, B, . . .

In the same manner, optical fibers extending from output 1b are bundled into groups of one hundred optical fibers. Each group is connected to corresponding photosensors a, b, . . . The total number of the photosensors required is two hundred.

That is to say, the first row of the photosensors indicated by A, B, . . . and the second row of photosensors indicated by a, b, . . . are summed up to be two hundred photosensors in all.

Figure 4:
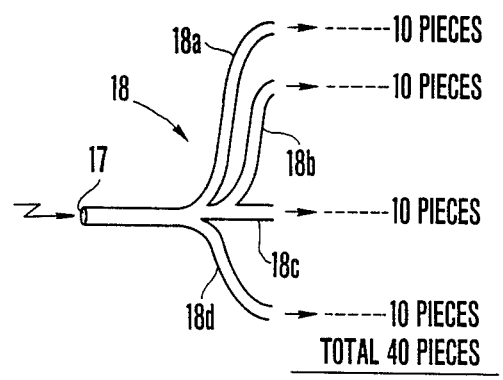
FIG. 4 shows the number of light beam sensors needed when 10,000 optical fibers are each connected to light beam splitters having four output ports so that the optical fibers are bundled into groups for the purpose of connecting the bundled groups to the light beam sensors.
Figure 8:
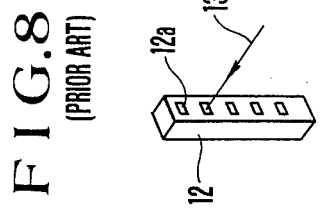
FIG. 8 is an outside perspective view for showing a divided type light beam receiving plate.
Figure 6:
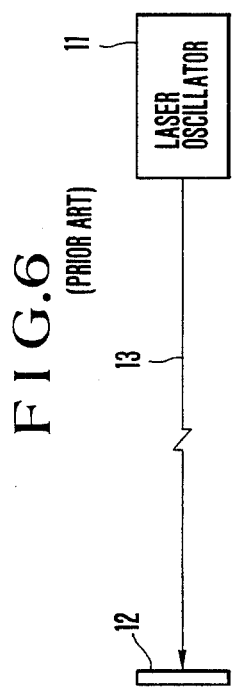
FIG. 6 is a side view of an ordinary case where a laser beam is employed for measurement based on a reference line.

Further, as shown in FIG. 4, ten thousand optical fibers are each connected to a beam splitter 18 which is provided with four output ports 18a, 18b, 18c and 18d. Optical fibers extending from the uppermost output ports 18a are bundled into ten groups of one thousand optical fibers. Each group is connected to respective photosensors. The total number of photosensors will be ten.

Next, one hundred optical fibers counted from top which extend the second output ports 18b are bundled into a group and another one hundred optical fibers, at an interval of nine hundred, are also bundled to be added to the group stated above, when this process is repeated in the same manner, the group will finally be a bundle of one thousand optical fibers. Each group is connected to a corresponding photosensor.

Further, every first ten out of one hundred optical fibers extending from the third output forts 18c is bundled into ten groups of one thousand optical fibers. Each group is connected to a corresponding photosensor. The total number of photosensors will be ten.

As a last step, every first one out of ten optical fibers extending from the fourth output ports 18d is bundled to be ten groups of one thousand optical fibers. Each group is connected to a corresponding photosensor. The total number of photosensors will be ten. Namely, a light beam receiving plate consisting of an enormous number of ten thousand optical fibers requires only forty photosensors in all.

Figure 5:
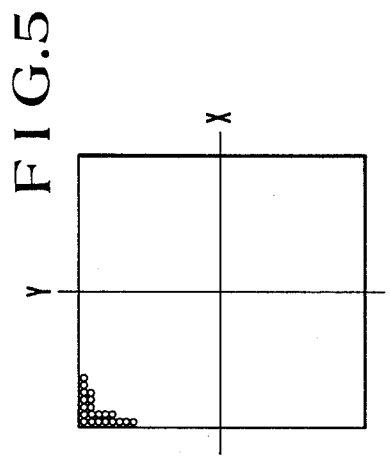
FIG. 5 is a front view showing a light beam receiving plane which is the case where the method according to the present invention is applied to a light beam receiving plate for a two-dimensional measurement.
Figure 7:
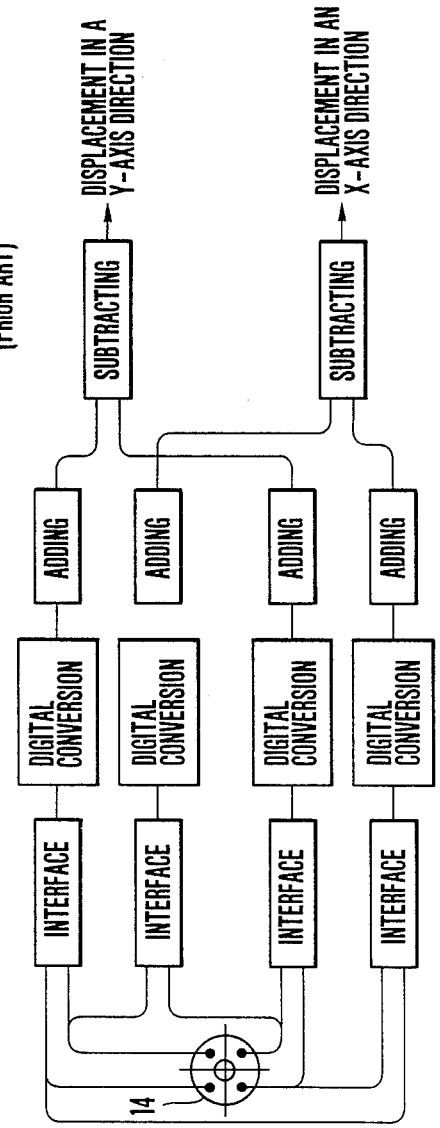
FIG. 7 is a fundamental structural view for locating a light beam receiving position for the purpose of detecting displacements in the X- and Y-directions.

FIG. 5 shows an embodiment wherein this invention is applied to a light beam receiving plate to be used for two-dimensional measurement. In a 10×10 cm plane ten thousand optical fibers are arranged an a matrix pattern. Optical fibers extending from the output ports are bundled into groups of one hundred optical fibers in vertical and horizontal rows. Each group is connected to a photosensor to constitute a method for detecting a position receiving a light beam for two-dimensional measurement.

In the method for detecting a position receiving a light beam by making use of optical fibers according to the present invention, a plurality of one-side end faces of optical fibers are arranged in a straight line or a plane to form a light beam receiving plate. Each optical fiber is branched by a beam splitter which is provided with a plurality of output ports. Optical fibers extending from the output ports are bundled into plurality of groups. Each group is connected to a photosensor which is constituted by a single light beam detecting element. Thus, a laser beam received by a light beam receiving plate is detected by way of optical fibers. Therefore this method has following advantages when compared to conventional methods:

(1) For either for one- or two-dimensional measurement, an increase in the area to be measured requires a far smaller increase in the number of photosensors required as compared to a corresponding area increase with conventional methods. Namely, beam splitters with a plurality of output ports are used and further, optical fibers from the output ports are formed in groups or sets to be connected to photosensors, which enables a measurement over a wide range with a small number of photosensors.

(2) A reduction in number of photosensors simplifies the accompanying electronic circuits and at the same time, shortens the processing time, resulting in the possibility of a rapid calculation of measured results.

(3) An arrangement of optical fibers in a one- or two-dimensional pattern can be easily performed with an optical fiber bundling technique. A light beam guiding path, from a plane receiving a laser beam to a photosensor on the output side by way of a beam splitter, need not be long, that is to say, it can be comparatively short with satisfactory results. Therefore the use of optical fibers made of low cost plastic resin are satisfactory from a view point of function.

As described above, the method for detecting a position receiving a light beam according to the present invention reduces the number of photosensors, results in simplification of the electronic circuits and eases manufacture and arrangement of optical fibers. By a multiplied effect between these advantages it is possible that this method exerts its utility as an extremely economic method for detecting a position receiving a light beam.

An example of this method applied to a measurement of a long range or span is a level detection for surveying. A level rod with optical fibers arranged in a vertical direction to receive a laser beam emitted from a rotary laser levelling device enables measured results to be obtained instantaneously. Further, it is possible to measure many points simultaneously with one laser light source.

What is claimed is:

1. A method for detecting the location of a spot irradiated by a light beam using optical fibers comprising:
providing a plurality of optical fibers, each of said optical fibers having a first end and a second end;
arranging said optical fibers so that the first ends thereof are in the form of a linear or two-dimensional array;
providing a plurality of light beam splitters, each having an input port and a plurality of light beam splitters, each having an input port and a plurality of output ports and an optical fiber extending from each said output port, said optical fibers extending from said output ports being bundled into a plurality of groups;
connecting each of said groups to a photosensor;
connecting each said second end of said optical fibers to an input port of a respective light beam splitter,
whereby, a light beam impinging upon said linear or two-dimensional array of first ends of said optical fibers is received by at least one of said first ends and detected by a said photosensor, so that a position of the light beam on said linear or two-dimensional array can be determined.

* * * * *